May 5, 1925.  
J. C. MECKLENBURG  
CULTIVATOR SHOVEL  
Filed Oct. 20, 1923

WITNESSES  
John Donovan  
George W. Wright

Inventor  
John C. Mecklenburg  
By Richard B. Olver,  
Attorney

May 5, 1925.

J. C. MECKLENBURG 1,536,120

CULTIVATOR SHOVEL

Filed Oct. 20, 1923

WITNESSES

Inventor
John C. Mecklenburg
By Richard B. Owen
Attorney

Patented May 5, 1925.

1,536,120

UNITED STATES PATENT OFFICE.

JOHN C. MECKLENBURG, OF HANCOCK, MINNESOTA.

CULTIVATOR SHOVEL.

Application filed October 20, 1923. Serial No. 669,833.

*To all whom it may concern:*

Be it known that I, JOHN C. MECKLENBURG, a citizen of the United States, residing at Hancock, in the county of Stevens and State of Minnesota, have invented certain new and useful Improvements in a Cultivator Shovel, of which the following is a specification.

This invention appertains to farming implements and more particularly to cultivators.

The primary object of the present invention is to provide a novel shovel for corn cultivators which is so constructed as to effectively cut weeds, bushes and the like and thus effectively destroy the same and which will also effectively work a relatively large area of ground during the cutting process.

Another prime object of the invention is the provision of an extension for the mold board of a cultivator shovel, so that the shovel can be effectively used on small growing corn, as well as on relatively large growing corn.

A still further object of the invention is the provision of novel means for clamping the improved cultivator shovel to the usual supporting feet or standards of a corn cultivator, the clamp being so constructed as to permit the easy connection of the improved shovel with the cultivator foot and to prevent accidental displacement of the shovel from off of the foot.

A still further object of the invention is to provide an improved cultivator shovel of the above character, which will be durable and efficient in use, one that will be simple and easy to manufacture and one which can be placed upon the market and incorporated with an ordinary corn cultivator at a minimum cost.

With these and other objects in view, the invention consists in the novel construction, arrangement, and formation of parts, as will be hereinafter more fully described, claimed, and illustrated in the accompanying drawings, in which drawings:

Figure 1:
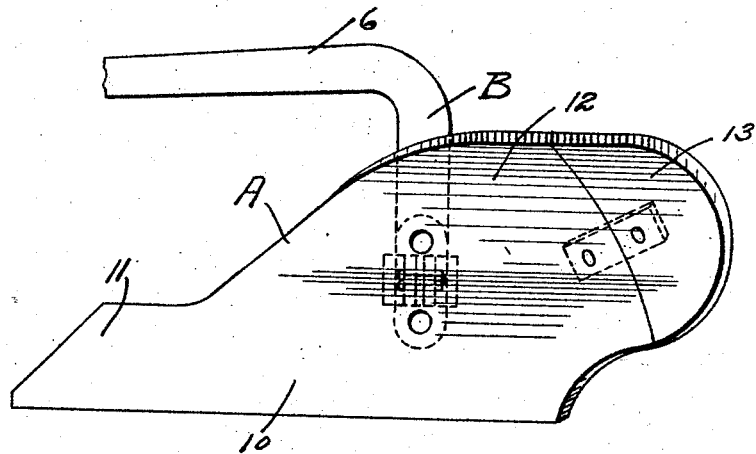
Figure 1 is a side elevation of one of the improved shovels showing the same attached to a cultivator foot.

Referring to the drawings in detail, wherein similar reference characters designate corresponding parts throughout the several views, the letter A generally indicates the improved cultivator shovel and B a cultivator foot or standard. The cultivator foot or standard B is of the ordinary construction and is connected at its forward end to the beam 6, as clearly shown in Figures 1 and 2 of the drawings.

While in the drawings I have only illustrated one shovel A, it is to be understood that a plurality of shovels are used on the cultivator, preferably three on one side and three on the right-hand side, the shovels being left and right-handed respectively.

The improved cultivator shovel A comprises a body portion 10 having the weed cutting nose 11 formed on the forward end thereof and the outwardly and laterally curved mold board 12 on its upper rear end. The body portion 10, the cutting nose 11, and the mold board 12 are preferably formed integral and the shovel can be formed from sheet metal as clearly shown in the drawings.

An independent extension 13 is provided for the mold board 12, when the shovel A is being used for cultivating corn which has grown to a relatively high height and this extension 13 forms a continuation of the mold board 12. The extension 13 is of course removed when cultivating small corn plants and is detachably connected to the mold board 12 by means of a metal strap 14. Bolts 15 extend through the strap and the extension 13 and mold board 12 respectively as clearly shown in Figure 2 of the drawings.

In order to permit the connection of the shovel A with the ordinary standard or cultivator foot B, I provide a novel clamp 20, which comprises an attaching body plate 21 and companion clamping jaws 22 and 23 for engaging about the cultivator foot or standard.

Figure 5:
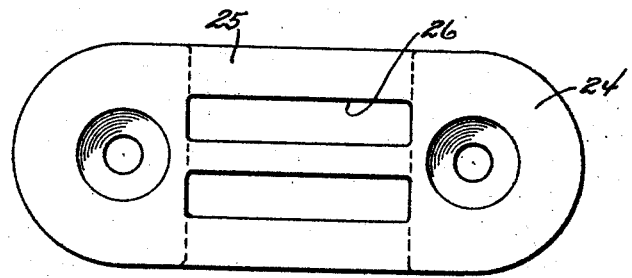
Figure 5 is a detail elevation of a body portion of the clamp.
Figure 6:
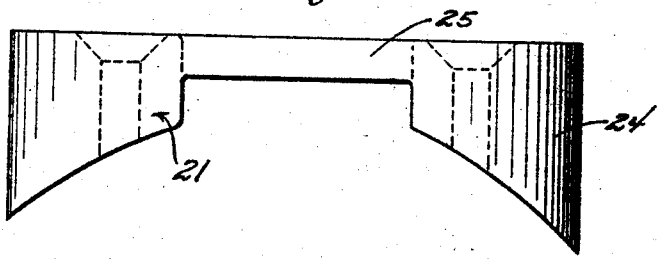
Figure 6 is an edge elevation of the same.

The attaching body plate 21 is clearly illustrated in Figures 5 and 6 and embodies terminal lugs 24 and a connecting plate 25, which is provided with vertically extending spaced parallel slots 26.

The companion clamping jaws 22 and 23 each include an arcuate body 27 which has formed on its inner end a hook 28, which is adapted to extend through one of the slots 26. The outer ends of the body portions 27 of the jaws 22 and 23 are provided with spaced parallel lugs 28 which are adapted to be connected together by means of an adjusting bolt or the like 30. The terminal lugs 24 of the attaching body plate 21 are riveted or otherwise secured, as at 31 to the shovel A and the hooks 28 of the companion jaws 22 and 23 are inserted in the slots 26 after which the jaws are placed about the standard or cultivator foot 6. The adjusting bolt 30 is inserted through the ears 29 which will of course effectively draw the jaws into intimate contact with the cultivator foot or standard B, which will hold the shovel A in position against accidental displacement.

Figure 2:
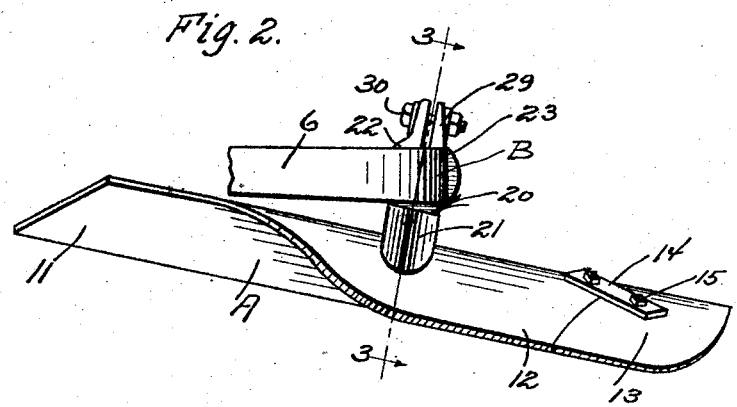
Figure 2 is a top plan view of the improved shovel showing the same attached to a cultivator.
Figure 3:
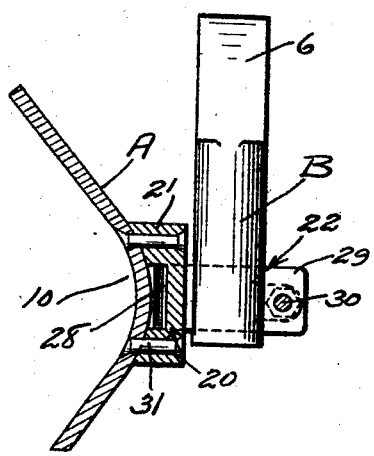
Figure 3 is a detail section taken on the line 3—3 of Figure 2.
Figure 4:
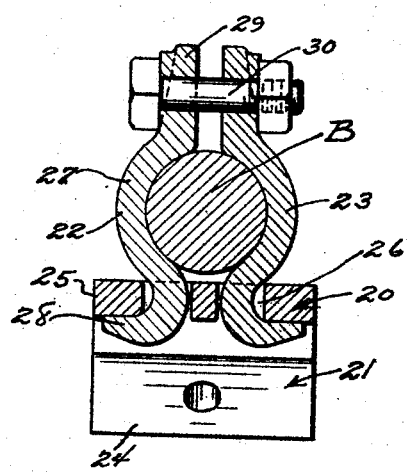
Figure 4 is a horizontal section showing the novel clamp utilized for connecting the shovel with the plow standard or foot.

In use of the improved shovel, the same is disposed at an angle to the beam 6 as shown in Figure 2 of the drawing and the nose 11 will effectively sever and uproot weeds, bushes and the like, while the mold board 12 and extension 13 will turn over the earth and thus effectively cultivate the same.

Changes in details may be made without departing from the spirit or the scope of this invention.

What I claim as new is:

The combination with a cultivator standard, of a cultivator foot and a clamp for connecting the foot to the standard including an attaching body plate secured to the shovel having a pair of spaced slots therein, a pair of companion clamping jaws including arcuate body portions for embracing the standard, curved hook portions formed on the inner ends of the body portions for engaging through said slots in the attaching body plate, and spaced outwardly extending ears formed on the opposite terminals of the body portions, and means for adjustably connecting the ears together.

In testimony whereof I affix my signature in presence of two witnesses.

JOHN C. MECKLENBURG.

Witnesses:
H. H. LORD,
F. R. PUTNAM.